(12) United States Patent
Helot et al.

(10) Patent No.: US 6,842,337 B2
(45) Date of Patent: Jan. 11, 2005

(54) STABILIZING SYSTEMS FOR COMPUTER HARDWARE

(75) Inventors: Jacques H Helot, Grenoble (FR); Gilbert Rahmouni, Claix (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 59 days.

(21) Appl. No.: 10/274,510

(22) Filed: Oct. 17, 2002

(65) Prior Publication Data

US 2003/0081376 A1 May 1, 2003

(30) Foreign Application Priority Data

Oct. 17, 2001 (EP) .............................................. 01410129

(51) Int. Cl.[7] .................................................. G06F 1/16
(52) U.S. Cl. .................. 361/683; 312/223.2; 312/351.9
(58) Field of Search .............................. 361/610, 683, 361/724; 248/188.1, 188.8, 346.01; 312/223.1, 223.2

(56) References Cited

U.S. PATENT DOCUMENTS

| | | | |
|---|---|---|---|
| 4,635,811 A | 1/1987 | Lodi | 220/69 |
| 4,872,733 A | 10/1989 | Tedham et al. | 312/255 |
| 5,020,768 A | 6/1991 | Hardt et al. | 248/678 |
| 5,388,792 A | 2/1995 | Hastings et al. | 248/188.1 |
| 5,749,637 A | 5/1998 | McMahan et al. | 312/223.2 |
| 5,887,962 A * | 3/1999 | Tsai | 312/351.9 |
| 5,934,774 A * | 8/1999 | Wu et al. | 312/223.2 |
| 6,288,893 B1 * | 9/2001 | Faranda et al. | 361/683 |

* cited by examiner

Primary Examiner—Darren Schuberg
Assistant Examiner—Anthony Q. Edwards

(57) ABSTRACT

A stabilizing system for a computer casing is provided which includes at least one stabilizing member pivotally attached to the computer casing at a proximal end. The stabilizing means is attached in such a way so that when the stabilizing member is in a storage configuration it is recessed flush with, or within the surface of, the computer casing. To configure it is in a stabilizing configuration it is pivoted into a position whereby it extends from the computer casing in such a way as to increase the effective footprint of the computer casing. The angle of rotation is oriented to the vertical in such a way that when the one or more stabilizing means are pivoted outwardly, the computer casing is elevated. This enhances the stability of the computer casing and allows for the circulation of air.

15 Claims, 4 Drawing Sheets

STABILIZING SYSTEMS FOR COMPUTER HARDWARE

TECHNICAL FIELD

The present invention relates to apparatus for mounting and/or stabilizing computers and computer related hardware. More particularly, although not exclusively, this invention relates to devices for mounting and/or stabilizing desk-top, portable and small form-factor computers in orientations which ensure that necessary operating functions such as cooling etc are not compromised.

BACKGROUND ART

Traditional designs for personal computers have evolved from the 'standard' personal computer, exemplified by the IBM-AT, to small form-factor PCs such as the e-PC manufactured by Hewlett Packard Company. This design development has resulted in many innovative and creative designs solutions reflecting the acceptance of such hardware in the business and home environment. This evolution in design has also been influenced by aesthetic considerations which were previously considered secondary to the basic task of housing the internal computer hardware in a functional casing unit.

Early types of personal computers were generally characterized by a horizontally mounted motherboards resulting in a quite low case profile with a relatively large footprint. This was necessitated by the PC case needing to be sufficiently large to accommodate motherboard, disk drives, power supplies etc. Early expansion board topologies reinforced the popularity of this type of case construction. However such designs consumed a significant amount of desk or floor space and a number of design solutions were proposed to reduce the PC footprint.

Early adaptations of known PC designs aimed at reducing the PC footprint included mounting the PC case on its side. Such solutions often involved simply tilting a standard PC on its edge, or constructing the case and chassis in a vertical orientation. Designs of the latter type are referred to as 'tower' configurations and sometimes involve the redesign of the computers internal hardware topology to accommodate this orientation.

A common problem with such configurations is that upright or slim line computer cases can be unstable and prone to tipping over. This is particularly so when the computer is located on the floor or perhaps where additional hardware components, for example external disk drives etc, are located on top of the computer case.

Early simple solutions included providing a separate resilient plastic 'foot' device in the form of a cradle into which the edge-mounted PC case could be slid. Such designs are not ideal as PC cases come in a variety of dimensions and not all feet can accommodate every model of PC. Other solutions include integrally molding into the base of the tower case, an outwardly oriented flange or rim. Others include incorporating molded or extruded rails mounted along the edge of the computer casing to extend the footprint slightly. Such methods can increase the footprint and improve stability. However, they may not be ideal as they often do not provide sufficient stability and flexibility in terms of operating functions (cooling etc). These modifications can also interfere with aesthetic aspects or the casing as well as hamper the ability to quickly and easily reorient the computer in a horizontal or vertical position.

More recent solutions include stabilizer constructions in the form of a casing-wall section which, when rotated, extends the casing face outwardly forming a flat "foot" protruding from either side of the machine. This configuration leaves the computer case flush with the floor or desktop and requires significant engineering to incorporate the pivoting foot into the casing wall. Further, the construction of this type of foot is such that its' width (in the lateral direction of the PC case), is approximately the same as the height of the PC case when the case is lying flat. This width does not contribute to the stability of the PC case when the foot is extended and may complicate the internal construction of the case. Such a construction may also be problematic in situations where cooling vents or intakes would be obscured when the PC is mounted in the upright or vertical position with the foot extended. The foot construction described above does not allow through-wall cooling of components located adjacent tie lower PC case wall.

It is an object of the present invention to provide for a means and device for stabilizing a PC or computer equipment which is aesthetically pleasing, non-intrusive, compact, solid, easy to retract/extend and which allows through-wall cooling through the underside of the vertically mounted computer or hardware component casing.

DISCLOSURE OF THE INVENTION

In one aspect the invention provides for a stabilizing system for a computer casing including at least one stabilizing member pivotally attached to the computer casing at a proximal end in such a way that when the stabilizing member is in a storage configuration it is recessed flush with, or within the surface of, the computer casing and when it is in a stabilizing configuration it is pivoted into a position whereby it extends from the computer casing in such a way as to increase the effective footprint of the computer casing.

The stabilizing means is preferably attached to the computer casing in such a way that when the stabilizing means is rotated into the stabilizing position, the computer casing is elevated in relation to a support surface upon which it rests. Thus the computer may be stabilized and cooled effectively and easily given the quick configuration of the stabilizing system.

For enhanced stability and ease of construction, the stabilizing mean is preferably in the form of an elongate, flat member.

The computer casing may incorporate a recess shaped and adapted to receive the stabilizing means in the storage configuration flush with, or concealed within the surface of, the computer casing.

The computer casing in the stabilizing configuration defines a vertical axis which is substantially perpendicular to the support surface. The pivot arrangement is preferably adapted so that the computer is elevated when the stabilizing means is pivoted into position.

Preferably the pivot arrangement corresponds to a hinge having a rotational direction vector angled away from the vertical axis so that when the stabilizing means is pivoted into the stabilizing configuration, the distal end of the stabilizing means is displaced toward the support surface and thus the computer casing is elevated.

The hinge may be in the form of a pin joining a substantially flat stabilizing means to the computer casing at a proximal end, the pin penetrating the stabilizing means substantially perpendicular to a plane defined by the substantially flat stabilizing means and where the distal end of the substantially flat stabilizing means forms an edge which acts as a support foot.

The stabilizing means and/or the recess may incorporate means to releasably secure the stabilizing means in the stabilizing and/or storage configurations.

In a preferred embodiment, the stabilizing system incorporates two or more stabilizing means.

In an alternative aspect, the invention provides for a computer casing incorporating the stabilizing system as hereinbefore defined.

In yet a further aspect, the invention provides for a stabilizing means adapted for use in the stabilizing system or the computer casing as hereinbefore defined.

BRIEF DESCRIPTION OF THE DRAWINGS

The present invention will now be described by way of example only and with reference to the drawings in which.

BEST MODE FOR CARRYING OUT THE INVENTION

One of the main aims of the present invention is to stabilize hardware, particularly computer hardware, when it is oriented in a vertical position such that there is a risk of the equipment toppling or falling over. To achieve an increase in stability of such devices, the effective footprint is increased. The effective footprint of the computer casing can be usefully defined as the effective "area" which is encompassed by the base of the computer where that area contributes to the stability of the computer. In the simplest case where no stabilizing system is employed, the effective footprint is the area of the base of the computer casing, or sidewall as the case may be, which rests on the support surface. In the prior art cases discussed in the preamble to this specification, the effective area can be increased by the planar rotation of a support foot so that it extends outwardly from either side of the casing. This is referred to as extending the effective footprint in a direction substantially perpendicular to the front-back axis of the computer casing.

Figure 1:
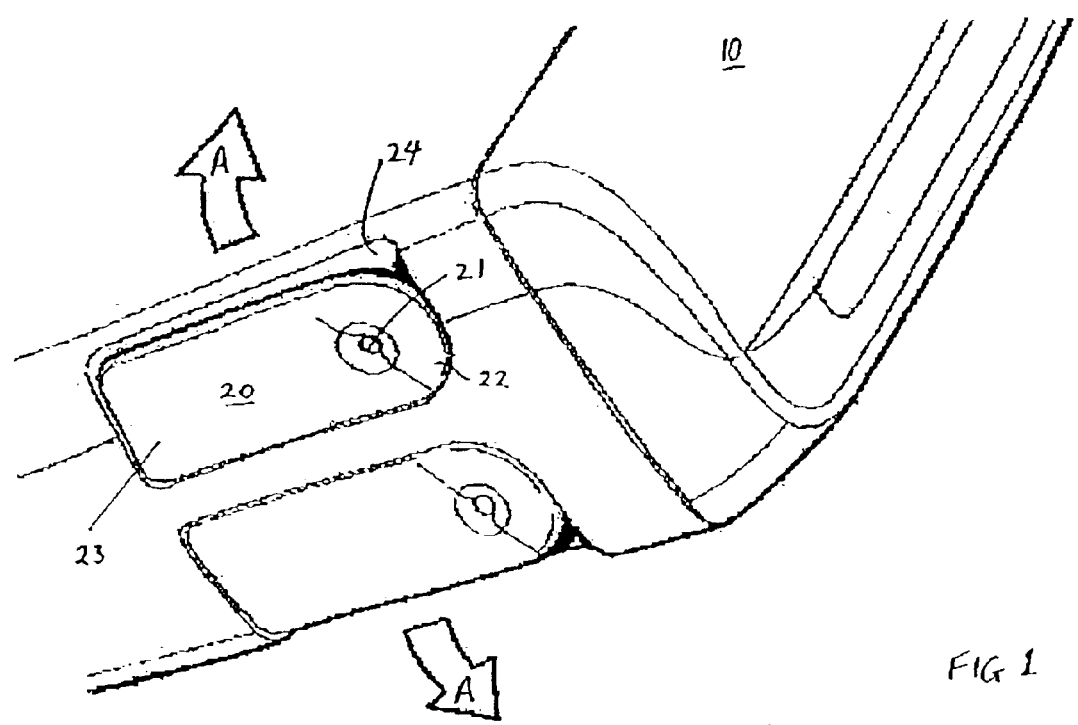
FIG. 1: illustrates an underside view of a computer casing incorporating a stabilizing system having two stabilizing means in the storage configuration.
Figure 2:
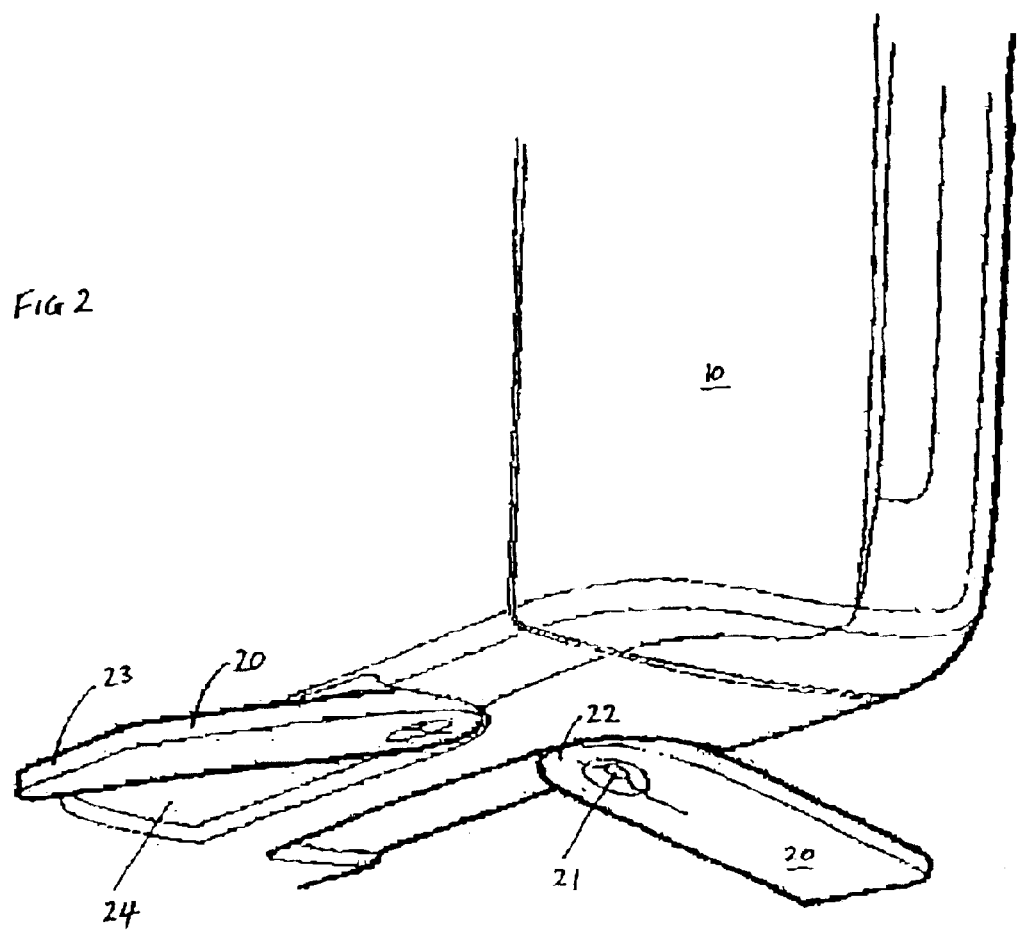
FIG. 2: illustrates an underside view of a computer casing with the stabilizing means in the stabilizing position swung out from the storage configuration.

According to the present preferred embodiment, FIG. 1 illustrates a simple and robust design for a stabilizing system for a computer casing. Referring to FIG. 1, a stabilizing system for a computer casing 10 includes at least one stabilizing member 20. This member 20 is pivotally attached to the computer casing at a proximal end 22. When the stabilizing member is in a storage configuration such as that shown in the figure, it is recessed flush with, or within the surface, of the computer casing 10. To configure it in the stabilizing configuration as shown in FIG. 2 the stabilizing means 20 is pivoted into a position as indicated by the letter A so that it extends from the computer casing in such a way as to increase the effective footprint of the computer casing.

Each stabilizing member 20 is pivotally attached to the computer casing 10 at a proximal, end 22. When it is to be configured in the stabilizing configuration the stabilizing member 20 is pivoted into a position so that it extends from the computer casing in such a way as to increase the effective footprint of the computer casing. This is shown in FIG. 2.

The stabilizing means 20 is attached to the computer casing 10 in such a way that when it is rotated into the stabilizing position, the computer casing 10 is elevated in relation to a support surface upon which it rests.

In the preferred embodiment shown, the stabilizing means 20 is in the form of an elongate, flat member or foot with a proximal end 22 and a distal end 23 The edge of the distal end forms an edgewise foot upon which the computer rests.

Figure 3:
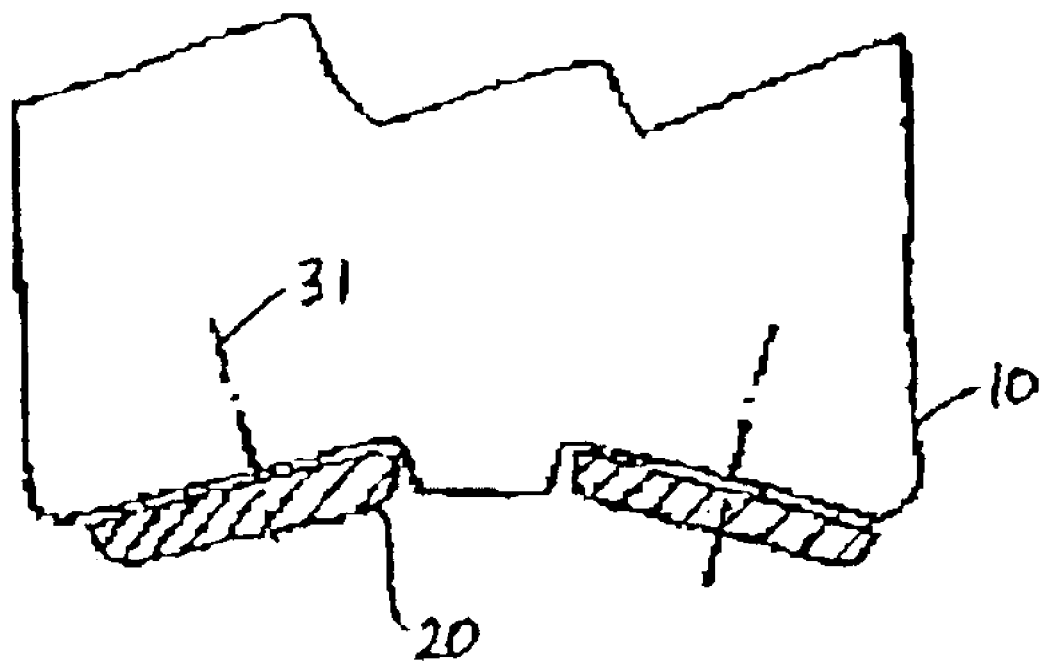
FIG. 3: illustrates a cross-section through the computer casing of FIG. 1 showing the stabilizing means in the storage configuration.

To allow the stabilizing means 20 to be stored during shipping or when the computer casing 10 is mounted horizontally, the computer casing 10 incorporates a recess 24 corresponding to each stabilizing means This recess 24 is shaped so as to receive the stabilizing means 20. That is, when the stabilizing means 20 is rotated into the storage configuration, it is concealed flush with the surface of the casing 10 as shown in FIGS. 1 and 3. The system may also possibly include covers (not shown), which could be used to completely conceal the stabilizing means 20 when they are pivoted into the computer casing.

To describe the orientation of the hinge/pivot arrangement 21 and the stabilizing means 20, it is useful to define a vertical axis corresponding to the computer casing 10 in the stabilizing configuration. This defines a vertical axis which is substantially perpendicular to the support surface (not shown). The axis of rotation of the pivot arrangement 31 is oriented so that the computer casing 10 is elevated when the stabilizing means 20 is pivoted into the support position.

In the embodiment shown, the pivot arrangement corresponds to a hinge 21 having a rotational direction vector 31 angled away from the vertical axis so that when the stabilizing means 20 is pivoted into the stabilizing configuration, the distal, or outward, end of the stabilizing means 20 is displaced toward the support surface. Thus the computer casing 10 is elevated. This is most clearly seen in FIG. 4.

The hinge may be in the form of a pin 21 which joins the flat stabilizing means 20 to the computer casing 10 at a proximal end 22. As seen in FIG. 3, the pin 21 penetrates the stabilizing means 20 in a direction generally perpendicular to a plane defined by the flat stabilizing means 20.

Further refinements or variations including providing the stabilizing means 20 and/or the recess 24 with means to releasably secure the stabilizing means 20 in the stabilizing and/or storage configurations. Such a modification may comprise a detent and catch in the upper surface of the stabilizing means and the area of the recess adjacent the detent respectively. Such a mechanism would ideally be capable of disengagement by a user and also lock the stabilizing means into the storage position for shipping etc.

In the embodiment illustrated, a pair of stabilizing means 20 is shown in the retracted (FIG. 1) and stabilizing (FIG. 2) position. It is possible that the computer casing might incorporate two pairs of stabilizing means one pair at the front of the casing and the other pair at the rear.

Figure 4:
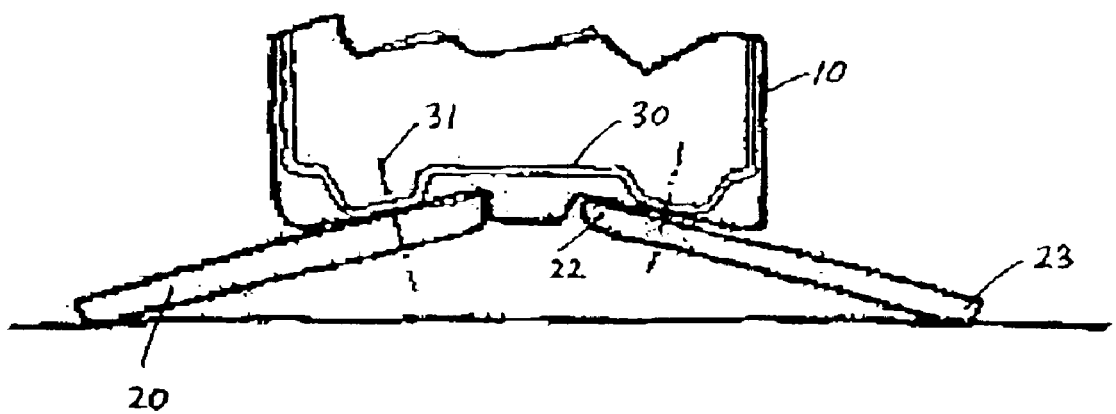
FIG. 4: illustrates a cross-section through the computer of FIG. 2 showing the stabilizing means in the stabilizing configuration.

The present invention is flexible in implementation and would scale relatively easily to the size of the particular computer casing. Further, the components of the system according to the invention may be fabricated by plastic injection molding and provides for straightforward assembly. The recesses 24 in the computer casing may need to be strengthened depending on the weight of the computer which is to be supported. A possible construction which addresses this issue is shown in FIG. 4 whereby an internal metal framework 30 is provided. The pins 21 connecting the stabilizing means 20 to the casing 10 may be attached via such a strong internal framework and provide additional stability and strength.

Although the invention has been described by way of example and with reference to particular embodiments it is to be understood that modification and/or improvements may be made without departing from the scope of the appended claims.

Where in the foregoing description reference has been made to integers or elements having known equivalents, then such equivalents are herein incorporated as if individually set forth.

What is claimed is:

1. A stabilizing system for a computer casing comprising:
   at least one stabilizing member pivotally attached to the computer casing at a proximal end in such a way that when the stabilizing member is in a storage configuration it is recessed flush with, or within the surface of, the computer casing and when it is in a stabilizing configuration it is pivoted into a position whereby it extends from the computer casing in such a way as to increase the effective footprint of the computer casing, wherein the computer casing in the stabilizing configuration defines a vertical axis which is substantially perpendicular to the support surface; and
   a pivot arrangement of the stabilizing member comprising a hinge having a rotational direction vector angled away from the vertical axis so that when the stabilizing member is pivoted into the stabilizing configuration, the distal end of the stabilizing member is displaced toward the support surface and thus the computer casing is elevated.

2. A stabilizing system as claimed in claim 1 wherein the stabilizing member is in the form of an elongate, flat member.

3. A stabilizing system as claimed in claim 1 wherein the computer casing incorporates a recess which is shaped and adapted to receive the stabilizing member in the storage configuration flush with, or concealed within the surface of, the computer casing.

4. A stabilizing system as claimed in claim 1 wherein the hinge is in the form of a pin joining a substantially flat stabilizing member to the computer casing at a proximal end, the pin penetrating the stabilizing member substantially perpendicular to a plane defined by the substantially flat stabilizing member and where the distal end of the substantially flat stabilizing member forms an edge which acts as a support foot.

5. A stabilizing system as claimed in claim 3 wherein the stabilizing member and/or the recess incorporate means to releasably secure the stabilizing member in the stabilizing and/or storage configurations.

6. A stabilizing system as claimed in claim 1 incorporating two or more stabilizing members.

7. A computer casing incorporating the stabilizing system as claimed in claim 1.

8. A stabilizing system for a computer casing comprising:
   at least one stabilizing means pivotally attached to the computer casing at a proximal end in such a way that when the stabilizing means is in a storage configuration it is recessed flush with, or within the surface of, the computer casing and when it is in a stabilizing configuration it is pivoted into a position whereby it extends from the computer casing in such a way as to increase the effective footprint of the computer casing, wherein the computer casing in the stabilizing configuration defines a vertical axis which is substantially perpendicular to the support surface;
   a pivot arrangement of the stabilizing means comprising a hinge having a rotational direction vector angled away from the vertical axis so that when the stabilizing means is pivoted into the stabilizing configuration, the distal end of the stabilizing means is displaced toward the support surface and thus the computer casing is elevated.

9. A stabilizing system as claimed in claim 8 the stabilizing means is in the form of an elongate, flat member.

10. A stabilizing system as claimed in claim 8 wherein the computer casing incorporates a recess which is shaped and adapted to receive the stabilizing means in the storage configuration flush with, or concealed with the surface of, the computer casing.

11. A stabilizing system as claimed in claim 8 wherein the hinge is in the form of a pin joining a substantially flat stabilizing means to the computer casing at a proximal end, the pin penetrating the stabilizing means substantially perpendicular to a plane defined by the substantially flat stabilizing means and where the distal end of the substantially flat stabilizing means forms an edge which acts as a support foot.

12. A stabilizing system as claimed in claim 10 wherein the stabilizing means and/or the recess incorporate means to releasably secure the stabilizing means in the stabilizing and/or storage configurations.

13. A stabilizing system as claimed in claim 8 incorporating two or more stabilizing means.

14. A computer casing incorporating the stabilizing system as claimed in claim 8.

15. A method for stabilizing a computer casing, the method comprising:
   pivotally attaching at least one stabilizing means to the computer casing at a proximal end in such a way that when the stabilizing means is in a storage configuration it is recessed flush with, or within the surface of, the computer casing and when it is in a stabilizing configuration it is pivoted into a position whereby it extends from the computer casing in such a way as to increase the effective footprint of the computer casing, wherein the computer casing in the stabilizing configuration defines a vertical axis which is substantially perpendicular to the support surface;
   providing a pivot arrangement for attaching the stabilizing means to the computer casing, the pivot arrangement comprising a hinge having a rotational direction vector angled away from the vertical axis so that when the stabilizing means is pivoted into the stabilizing configuration, the distal end of the stabilizing means is displaced toward the support surface and thus the computer casing is elevated.

* * * * *

UNITED STATES PATENT AND TRADEMARK OFFICE
CERTIFICATE OF CORRECTION

PATENT NO. : 6,842,337 B2  Page 1 of 1
DATED : January 11, 2005
INVENTOR(S) : Jacques Helot et al.

It is certified that error appears in the above-identified patent and that said Letters Patent is hereby corrected as shown below:

Column 6,
Line 14, change "claim 8 the" to -- claim 8 wherein the --

Signed and Sealed this

Seventh Day of June, 2005

JON W. DUDAS
*Director of the United States Patent and Trademark Office*